(12) United States Patent
Buskirk, Jr. et al.

(10) Patent No.: US 6,424,997 B1
(45) Date of Patent: Jul. 23, 2002

(54) MACHINE LEARNING BASED ELECTRONIC MESSAGING SYSTEM

(75) Inventors: Martin C. Buskirk, Jr., Raleigh, NC (US); Frederick J. Damerau, North Salem; David H. Johnson, Cortlandt Manor, both of NY (US); Marguerite Raaen, Silver Spring, MD (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/237,886

(22) Filed: Jan. 27, 1999

(51) Int. Cl.[7] .............................................. G06F 15/16

(52) U.S. Cl. ........................ 709/206; 709/201; 709/220

(58) Field of Search ................................ 709/201, 220, 709/228, 206, 204, 226, 230; 717/1, 3; 364/401

(56) References Cited

U.S. PATENT DOCUMENTS

| | | | |
|---|---|---|---|
| 5,283,856 A | | 2/1994 | Gross et al. ................. 709/201 |
| 5,369,570 A | * | 11/1994 | Parad ......................... 364/401 |
| 5,377,354 A | | 12/1994 | Scannell et al. ............. 709/220 |
| 5,608,874 A | * | 3/1997 | Ogawa et al. ............... 709/201 |
| 6,094,649 A | * | 7/2000 | Bowen et al. .................. 707/3 |
| 6,256,773 B1 | * | 7/2001 | Bowman-Amuah ............ 717/1 |
| 6,275,850 B1 | * | 8/2001 | Beyda et al. ................ 709/206 |

* cited by examiner

Primary Examiner—Ayaz Sheikh
Assistant Examiner—Khanh Quang Dinh
(74) Attorney, Agent, or Firm—Whitham, Curtis & Christofferson P.C.; Stephen C. Kaufman

(57) ABSTRACT

A machine learning based electronic mail system. A classifier and action selection module analyzes the incoming message and classifies the messages with associated confidence levels, which may include analyzing the electronic message by tokenization of the text, morphological analysis of the text, and other well known processes. The classifier and action selection module then determines the appropriate action or actions to effect on the message.

11 Claims, 2 Drawing Sheets

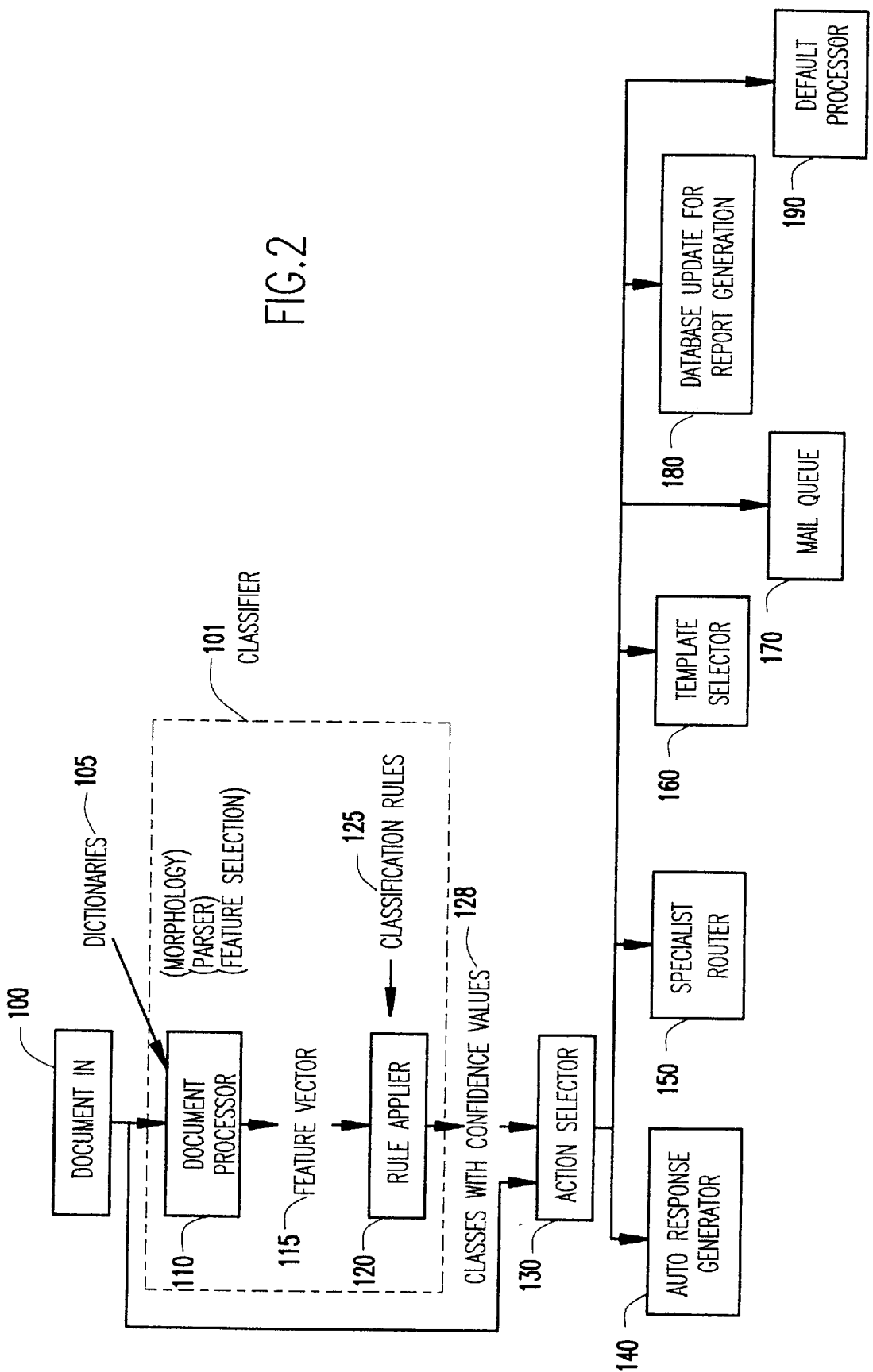

MACHINE LEARNING BASED ELECTRONIC MESSAGING SYSTEM

BACKGROUND OF THE INVENTION

1. Field of the Invention

The present invention generally relates to an electronic message classification system and, more particularly, to an electronic messaging system that assigns an incoming message a set of classification outputs in order to automatically effect an appropriate action on the incoming message.

2. Background Description

Businesses and institutions receive and generate many electronic messages in the course of their commerce and activities. These electronic messages are typically electronic mail (e-mail) messages routed, via a mail system (e.g., server), to a specific individual or individuals. Once the specific individual or individuals receive the message, it is opened, read, and an appropriate action is taken, such as, for example, forwarding the message to another individual, responding to the message or performing countless other actions.

In typical electronic mail systems, the message is routed to a server and is stored on the server until the individual requests the message. At that time, the server simply finds the appropriate message by searching the headers of messages residing on the server, and forwarding the appropriate message to the requesting individual. The server typically does not perform any other activities, especially those activities requested by the message itself. This is because only the header information associated with the requesting individual is read, and not any other information within the message.

To further complicate matters, in large institutions, such as banks, electronic messages are routed to the institution generally, and not to any specific individual. In these instances, several individuals may have the sole function of opening and reading the incoming messages, and to properly route the messages so that, for example, an appropriate action by a qualified specialist can be performed on the message. As can be imagined, this is very time consuming and inefficient, especially when messages need expert attention in several divergent fields.

It is desirable, however, to have an electronic mail system that effectively and efficiently performs activities on the incoming messages. These activities may include prioritizing a message or, for example, automatically generating a report or response to the incoming message. This would be preferably performed without assistance from a qualified specialist or other individual first having to open, read and route the incoming message.

In order to perform these activities, certain information must be extracted from the electronic messages, such as a desired activity to be taken by a qualified specialist. To this end, considerable effort is now being made to develop software for the extraction of information from electronic messages. Such software is generally in the field of knowledge based or expert systems and uses such techniques a s parsing and classifying. The general applications, in addition to information extraction, include classification and categorization of natural language documents and automated electronic data transmission processing and including e-mail and facsimile.

SUMMARY OF THE INVENTION

It is therefore an object of the present invention to provide an electronic messaging system that assigns an incoming message a set of classification outputs in order to automatically effect an appropriate action on the incoming message.

The present invention describes a machine learning based electronic mail system. The system and method of the present invention receives incoming messages and classifies the information within the message. The classification is then used to automatically effect an appropriate action on the incoming message. These actions include, amongst other actions, (i) routing a message, (ii) prioritizing a message, (iii) automatically generating a response to the message, (iv) providing input to a report generator, or (v) initiating or continuing a dialog between the sender and the messaging system.

In preferred embodiments, a classifier and action selection module analyzes the incoming message and classifies the messages with associated confidence levels, which may include analyzing the electronic message by tokenization of the text, morphological analysis of the text, and other well known processes. According to the method and system of the present invention, the classifier and action selection module then determines the appropriate action to effect on the message.

BRIEF DESCRIPTION OF THE DRAWINGS

The foregoing and other objects, aspects and advantages will be better understood from the following detailed description of a preferred embodiment of the invention with reference to the drawings, in which:

FIG. 2 is block diagram of the general layout of the electronic messaging and routing system of the present invention.

DETAILED DESCRIPTION OF A PREFERRED EMBODIMENT OF THE INVENTION

Figure 1:
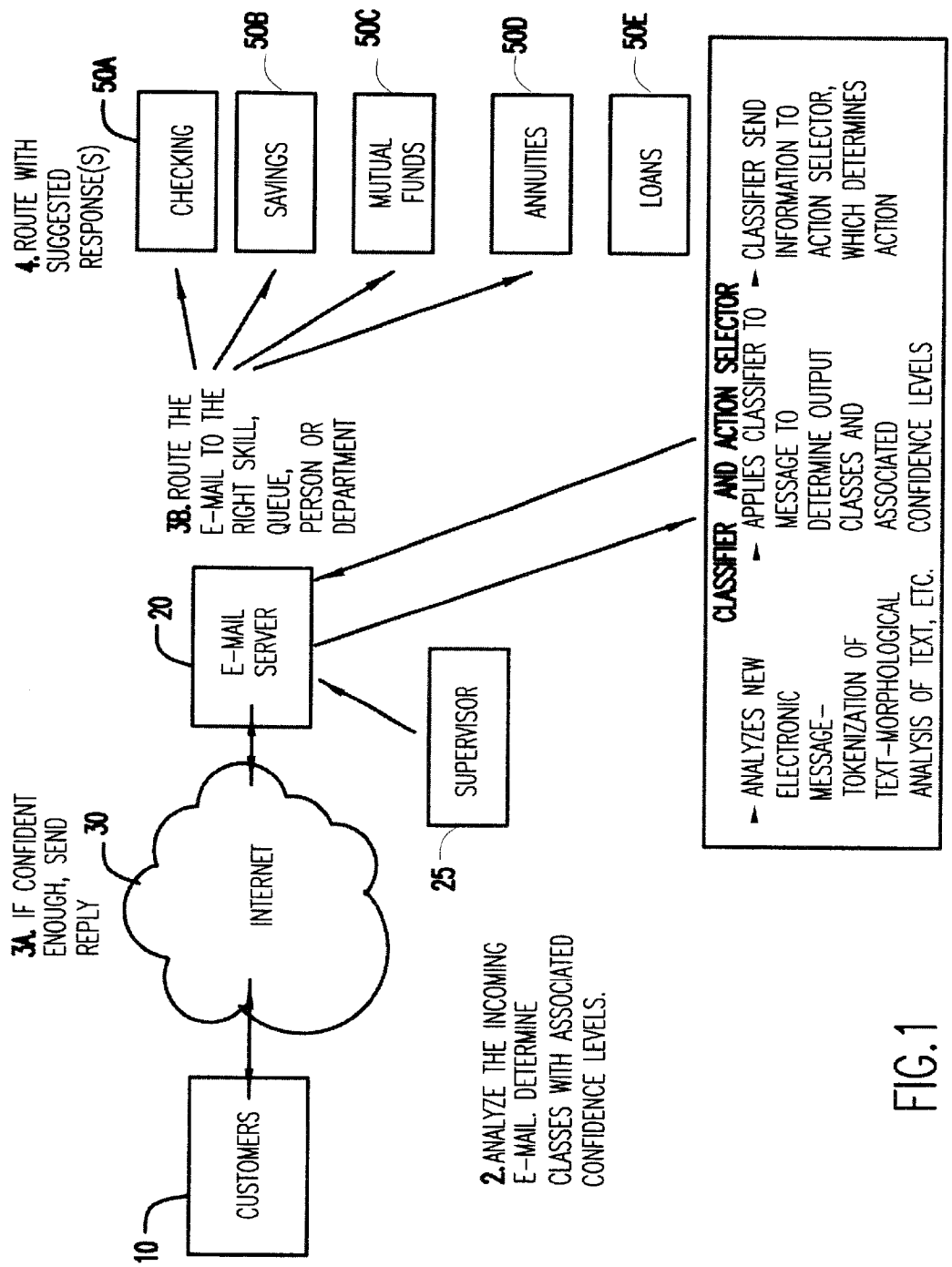
FIG. 1 is a flow diagram of the electronic messaging and routing system of the present invention.

The present invention is directed to a machine learning based electronic messaging system, and more specifically, a method and system for routing and/or performing an action on an incoming electronic message. In order to accomplish the objectives of the present invention, a machine learning based classifier or a set of classifiers (manual or machine generated) (collectively known as classifiers) is provided. These classifiers assign a set of classification outputs (e.g., class labels) and confidence values to an incoming electronic message which are then used by the method and system of the present invention to effect a variety of actions on the incoming electronic messages (e.g., documents) without the need, in many instances, for an individual to first open, read and route the incoming message to a skilled specialist. By way of example, these actions may include, but are not limited to, (i) routing a message, (ii) prioritizing a message, (iii) automatically generating a response to the message, (iv) providing input to a report generator, or (v) initiating or continuing a dialog between the sender and the messaging system.

It is well understood that the system and method of the present invention can be implemented using a plurality of separate dedicated or programmable integrated or other electronic circuits or devices (e.g., hardwired electronic or logic circuits such as discrete element circuits, or programmable logic devices such as PLDs, PLAs, PALs, or the like). A suitably programmed general purpose computer, e.g., a microprocessor, microcontroller or other processor device (CPU or MPU), either alone or in conjunction with one or more peripheral (e.g., integrated circuit) data and signal processing devices can be used to implement the invention. In general, any device or assembly of devices on which a finite state machine capable of implementing the flow charts shown in the figures can be used as a controller with the invention.

Referring now to the drawings, and more particularly to FIG. 1, there is shown a flow diagram of the general layout of the present invention. More specifically, in order to perfect the present invention, a sender 10 (e.g., customer) sends an electronic message via the Internet 30 to an individual or institution via a server 20. It is obvious to one skilled in the art that the sender 10 and Internet 30 are not critical to the understanding of the present invention, and a discussion of these features is thus omitted herein.

Referring still to FIG. 1, the server 20 receives the incoming messages and forwards the messages to a classifier and action selection module 25. The classifier and action selection module 25 analyzes the incoming message and classifies the messages with associated confidence levels and class labels. This analysis may include tokenization of the text, morphological analysis of the text, and other well known processes. The classifier and action selection module 25 then determines an appropriate action to effect on the message.

It is well understood by one of ordinary skill in the art that the classifier and action selection module 25 and the server 20 may be an integral unit. Thus, the tasks performed in the classifier and action selection module 25 may be equally performed in the server 20 such that the incoming messages do not have to be forwarded to a separate module. However, it is contemplated herein that the classifier and action selection module 25 and the server 20 may or may not be an integral unit, depending on the particular environment used with the system of the present invention.

Once the incoming message is classified using the above described system and method, the system of the present invention then routes the message to an appropriate skilled person, or automatically performs an appropriate action (as described in more detail below). In a perfecting feature of the present invention, the message may be routed to, for example, a (i) checking expert 50a, (ii) savings expert 50b, (iii) mutual funds expert 50c, (iv) annuities expert 50d, (v) loans expert 50e, and the like. However, the messages may equally be routed to other specialists or other actions effected on the messages depending on the particular application used with the present invention, such as, for example, retail stores, investment firms, manufacturers, and the like. Thus, the present invention is not limited to only one application, but may be used equally with countless other applications.

FIG. 2 shows a block diagram of the electronic messaging and routing system of the present invention. Specifically, a document (e.g., incoming electronic message) 100 and a dictionary 105 are input to a document processor module 110. The dictionary 105 may include, for example, stop word lists or lists of potential features. That is, for example, the dictionary 105 may include throw away terms or words or candidate features, both used to derive rules used with the system of the present invention. The document processor 110 then performs, for example, tokenization, morphological analysis, syntactic parsing, statistical analysis, or other feature selection functions.

The output of the document processor 110 is a representation of the document as a vector of features 115. The values of these vector features 115 may be binary or numerical, and are input to a rule applier module 120 with classification rules 125. The classification rules 125 may be derived by a machine learning algorithm. However, the classification rules 125 may be derived by manual analysis, manual modification of machine generated rules or a combination of the above. The classification rules 125 may be expressed as predicates on feature values and classification labels, possibly augmented with confidence values, as discussed in more detail below.

Class labels and confidence levels 128, derived from the rule applier module 125, are input to an action selector module 130. The original document, including the header information, may also be provided to the action selector module 130. At this stage, the header information of the original document and the confidence values (if any) and class labels 128 associated with the text of the original document information, can be used simultaneously in the action selector module 130 to select an appropriate action.

For example purposes only, these actions may include (i) providing conventional responses (e.g., canned responses) to the messages when the class assignments are nearly certain (automatic response generator 140), (ii) providing the document to a specialist for proper disposition (specialist router 150), (iii) providing the document to a template selector function that selects a template or incomplete response for a specialist or automated agent to complete (template selector 160), (iv) providing the document to a mail queue 170 or a database update for report generation 180 for generating a report, or (v) providing the document to a default processor 190 when no known action is associated with the document. Further "action" and "action modules" (not shown) may also be provided by the present invention, again depending on the specific application used with and by the system and method of the present invention. Thus, the present invention is not limited to the specific "actions" and "action modules" shown, but can be equally used with other "action modules".

Referring still to FIG. 2, the processes being performed in module 101 are now discussed in more detail. In embodiments, the development of a classifier for documents typically involves three major tasks including data preparation, training and testing. Data preparation involves obtaining a corpus of pre-classified data and training involves training a classifier on a corpus of pre-classified data. Testing includes testing the classifier with some subset of the pre-classified data set aside for this purpose.

More specifically, training data may include generating training vectors. In a perfecting feature of the present invention, generating training vectors may be divided into three steps:

1. Feature definition: Typically this involves breaking the text up into tokens. Tokens can then be reduced to their stems or combined to multi-word terms.

2. Feature count: Typically this involves counting the frequencies of tokens in the input texts. Tokens can be counted by their absolute frequency, and several relative frequencies (relativized to the document length, the most frequent token, square root, etc.).

3. Feature selection: This step includes weighting features (e.g., depending on the part of the input text they occur in: title vs. body), filtering features depending on how distinctive they are for texts of a certain class (filtering can be done by stop word list, based on in-class vs. out-class frequency etc.).

More specifically, the method and system of the present invention analyzes the incoming documents by breaking the raw text data of the document into tokens, which can then be reduced to their stems or combined to multi-word terms. These features are weighted (e.g., depending on the part of the input text they occur in, as for example, title vs. body) and may also be filtered depending on how distinctive they are for texts of a certain class. Filtering features may include, for example, a stop word list (e.g., filtering out unwanted words/terms/categories), or word frequency or category filtering (absolute/relative, threshold/in-class out-class). Filtering by frequency allows the user to specify the minimum number of examples (documents) of a category that must be present in the document collection. Filtering by category allows the user to specify a list of categories to be removed (or kept) in the document collection.

Further, the method and system of the present invention may also merge all features from different sections of the input text into one feature (as an intermediate output, this results in a feature value table). Class label(s) and tokenization of the training data may also be provided, and stemming, abbreviation expansion, names or term extraction etc., may further be used to define the used features.

The extracted data is then provided in a vector format, such as a feature count table and further reduced, if desired. The values of the feature vector may be in binary or numerical form, and may be provided in a simpler vector format (e.g., reduced) in order to use less disk space. The simple vector format may be provided in a feature (features occurring in different sections of the input are counted separately) and one line for each input document. Each cell in the feature count table may contain several different counts for the feature (absolute count plus several relative counts), and is designed to be as information rich as possible so that various runs using different counting, weighting or filtering strategies do not have to revisit the input text. The output of this feature is a table with vectors suitable as input for a chosen machine learning program.

The vector data may then be submitted to a machine learning module (not shown) where an algorithm is applied to the data. Alternatively, the rule may be derived by manual analysis, manual modification of machine generated rules or a combination of the above. Testing provides a precision, recall, accuracy or other statistic analysis of the tested data. The output of the learning module is a set of classification rules 126 (FIG. 2).

The confidence levels are determined from the training data by applying the rules to the training data, where each document in the training data has a known set of class labels. The class labels determine for each rule the relative frequency with which the rule is correctly applied. The relative frequency for each rule is the confidence level for that rule, for example, a number between 1 and 100. The confidence level for a given class assigned to a document is the highest confidence level of any rule that applies assigning the document to that class.

Accordingly, by using the system and method of the present invention, an incoming message is assigned a set of classification outputs in order to automatically effect an appropriate action on the incoming message. This action may be, for example, (i) responding to the message, (ii) generating a report and the like.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A method of effecting one or more actions on an electronic message, comprising the steps of:

receiving the electronic message including raw text data;
providing a dictionary including words or phrases;
analyzing the electronic message including the raw text data and the words or phrases;
assigning one or more class labels and confidence levels to analyzed electronic message based on the words or phrases; and
performing one or more actions on the electronic message based on the one or more class labels and confidence labels,
wherein the confidence levels for classes are obtained from training data associated with those classes assigned to the electronic message, and
wherein training on the training data includes the steps of:
breaking the raw data of the training data into tokens;
counting frequencies of the tokens in the training data;
analyzing the tokens by at least one of filtering and weighting the tokens of the training data; and
transforming the at least one of filtered and weighted tokens of the training data into vector format.

2. The method of claim 1, wherein the step of analyzing the electronic message includes analyzing header and body information of the electronic message.

3. The method of claim 1, further comprising the step of routing the electronic message to an action module for performing one or more actions on the electronic message based on the one or more class labels and confidence levels.

4. The method of claim 3, further comprising the step of assigning confidence levels to the one or more class labels prior to performing the one or more actions on the electronic message, wherein each of the actions is based on the one or more class labels and the confidence levels.

5. The method of claim 1, wherein the electronic message includes a plurality of electronic messages.

6. The method of claim 5, wherein an action includes prioritizing the electronic messages in a predetermined order such that the actions are performed in the predetermined order.

7. The method of claim 1, wherein an action includes automatically generating a response to the electronic message.

8. The method of claim 7, wherein the class labels and confidence levels directly or indirectly determine the action to be performed on the electronic message.

9. The method of claim 1, further comprising providing a dictionary used in assigning the class labels.

10. The method of claim 9, wherein the dictionary includes words or phrases used as features such that the class labels are based on the features.

11. An apparatus for effecting one or more actions on an electronic message, comprising:
means for receiving the electronic message including raw text data;
means for analyzing the electronic message including the raw text data;
means for assigning one or more class labels and confidence levels to the electronic message; and
means for performing an action on the electronic message based on the one or more class labels and confidence levels,
wherein the means for assigning the one or more confidence levels to the analyzed electronic message includes means for training on training data,
the training means includes:
means for breaking the raw text data of the training data into tokens;

means for counting frequencies of the tokens in the training data;
means for analyzing the tokens by at least one of filtering and weighting the tokens of the training data; and
means for providing the at least one of filtered and weighted tokens of the training data into vector format.

* * * * *

UNITED STATES PATENT AND TRADEMARK OFFICE
CERTIFICATE OF CORRECTION

PATENT NO.    : 6,424,997 B1
DATED         : July 23, 2002
INVENTOR(S)   : Buskirk, Jr. et al.

It is certified that error appears in the above-identified patent and that said Letters Patent is hereby corrected as shown below:

<u>Title page,</u>
Item [75], Inventors: "David H. Johnson" should read -- David E. Johnson --

Signed and Sealed this

Nineteenth Day of November, 2002

Attest:

JAMES E. ROGAN
Attesting Officer              Director of the United States Patent and Trademark Office